United States Patent [19]
Katoh

[11] Patent Number: 5,339,180
[45] Date of Patent: Aug. 16, 1994

[54] FLAT DISPLAY

[76] Inventor: Tadanobu Katoh, 1291 Chihara, Yakuno-cho, Amada-gun, Kyoto, Japan

[21] Appl. No.: 970,256

[22] Filed: Nov. 2, 1992

[30] Foreign Application Priority Data

Nov. 5, 1991 [JP] Japan .................. 3-350543

[51] Int. Cl.$^5$ .......................... G02F 1/1343
[52] U.S. Cl. ........................ 359/58; 359/59
[58] Field of Search ............ 359/58, 59; 257/59; 340/719

[56] References Cited

FOREIGN PATENT DOCUMENTS 0021126 1/1987 Japan ....................... 359/59
0136119 5/1989 Japan ....................... 359/59

Primary Examiner—William L. Sikes
Assistant Examiner—Huy Mai
Attorney, Agent, or Firm—Woodcock Washburn Kurtz Mackiewicz & Norris

[57] ABSTRACT

A flat display comprises a lower substrate including a matrix of pixel electrodes, column lines and row lines; an upper substrate having a common electrode; a Liquid Crystal material filled between said lower and upper substrates; and a plurality of transistors provided on another substrate and transferred or connected to said lower substrate in up side down fashion. The transistor has three bonding pads connected to said pixel electrode, column and row lines, respectively, aligned with the corresponding position of said lower substrate after transferring it to said lower substrate through transfer plates. Alternatively, a diode having an anode and a cathode bonding pads may be used.

9 Claims, 6 Drawing Sheets

FLAT DISPLAY

BACKGROUND OF THE INVENTION

1. Field of the Invention

The present invention relates to a flat display using Liquid Crystal (LC), EC or the like to realize a larger scale screen.

2. Description of the Prior Art

Heretofore, there are two methods for driving displays such as liquid crystals or like, that is, an active method and a passive method. The active method is extremely superior to the passive method in indicating characteristics such as picture quality, response characteristic and like. In practice, a large scale flat display can not be commercially available because its manufacturing is very hard. Formations of display cells being driven by active elements were developed by many manufacturers such as Sharp and Hitachi corporations since seventy eras based on semiconductor manufacturing technologies.

A typical flat display comprises a matrix of display cells each having common and lower electrodes, a matrix of transistors each having a collector connected to the lower electrode of the corresponding cell, column lines each connected to emitters of corresponding transistors in alignment with Y direction, and row lines each connected to bases of corresponding transistors in alignment with X direction. The lower electrodes, the transistors, the column and row lines are provided on a common glass substrate.

Therefore, semiconductor materials are stacked or covered on the substrate to provide an npn structure. The npn structure is partitioned into areas of the lower electrodes, the transistors and the column lines by lithography and photoetching. The remaining area is then oxygenated to provide a grid or grooves of silicon dioxide. The metallic row lines are coated on the npn structure after covering an insulation layer. Connections among the transistors, metallic column lines and lower electrodes are performed by contact hole technique.

This process is made by using technologies for manufacturing semiconductor chips such as photo-lithography, etching and plasma CVD (Chemical Vapor Deposition) methods. In conventional methods, a matrix of transparent pixel electrodes, wirings and a matrix of active elements such as transistors are provided on the glass substrate having a size, for example, six by eight inches. The transistors must be provided on the glass substrate with low density upon manufacturing large scale displays.

The transistors then occupy small area of the glass substrate after finishing, and are disposed with considerably long distance ratio. It is therefore difficult to unify characteristics of the transistors each provided on the glass substrate.

Yield of the flat display having uniform transistors also is reduced as well as increasing invested capital because the transistors must be provided on the large scale glass substrate with uniform characteristics. Therefore, the large scale flat display can not be commercially available by now.

As described above, there are conventional problems that yield of the flat display having pixels with uniform characteristics is low because the matrix of the transistors must be provided on the glass substrate with extremely low density by using semiconductor process.

The manufacturing apparatus dealing with large-scale semiconductor wafers is very expensive to produce a large size display.

SUMMARY OF THE INVENTION

The present invention has been made in consideration of the above situation, and has as its object to provide a flat display including a matrix of transistors each having uniform characteristics that receives an analogue video signal to be output to the corresponding LCD electrode with high fidelity.

It is another object of the present invention to provide the transistors each having bonding pads for an emitter, a base and a collector, or a drain, a gate and a source.

It is still another object of the present invention to provide the transistors with high-density on a high-molecular plastic film that is removed after transferring the transistors to a temporal transfer substrate.

It is still another object of the present invention to retransfer the transistors to another temporal substrate and then to a glass substrate on which a matrix of transparent lower electrodes for LCD, and column and row lines are coated or applied.

It is still another object of the present invention to align the transistor to the glass substrate so that its emitter, base and collector bonding pads contact the corresponding lower LCD electrode, and column and row lines, respectively, and then bond them by application of heat with laser beam.

It is still another object of the present invention to provide another flat display including a matrix of diodes each having uniform characteristics that receives an analogue video signal to be output to the corresponding LCD electrode with high fidelity. The diode has bonding pads for an anode and a cathode.

In order to achieve the above objects of the present invention, a flat display comprises:

a lower substrate including a matrix of pixel electrodes, column lines each extending along column direction and row lines each extending along row direction;

an upper substrate having a common electrode;

an electrically responsible material filled between said lower and upper substrates, and such as Liquid Crystal, EC or the like for changing its transmittance, refractive index, absorption coefficient or the like of light by applying electric energy;

a plurality of active elements provided on another substrate and each having three bonding pads connected to said pixel electrode, column and row lines, respectively, after each active element is aligned with the corresponding position of said lower substrate in up side down fashion to transfer said active elements to said lower substrate through a transfer plate.

Another flat display comprises:

a lower substrate including a matrix of pixel electrodes and column lines each extending along column direction;

an upper substrate including row electrodes each extending along row direction and having a wide substantially equal to that of pixel electrode;

an electrically responsible material filled between said lower and upper substrates, and such as Liquid Crystal, EC or the like for changing its transmittance, refractive index, absorption coefficient or the like of light by applying electric energy;

a plurality of diodes provided on another substrate and each having two bonding pads connected to said pixel electrode and column lines, respectively, after each diode is aligned with the corresponding position of said lower substrate in up side down fashion to transfer said diodes to said lower substrate through a transfer plate.

BRIEF DESCRIPTION OF THE DRAWINGS

These and other objects, features, and advantages of the invention will become more apparent upon a reading of the following detailed specification and drawing, in which.

DETAILED DESCRIPTION OF THE PREFERRED EMBODIMENT

Figure 1A:
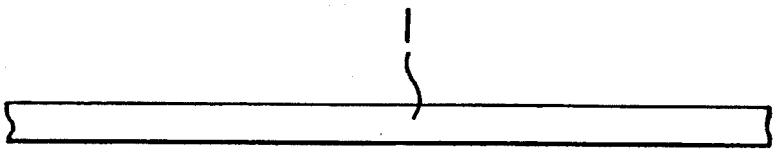
FIGS. 1(A-E) show sectional views for explaining essential process to provide transistors according to the present invention.
Figure 1B:
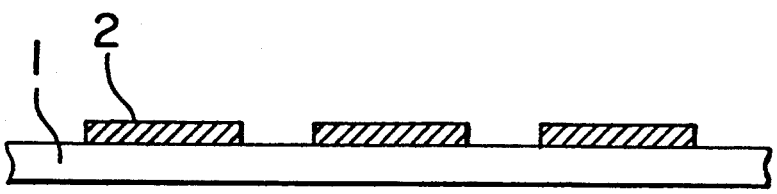
Figure 1C:
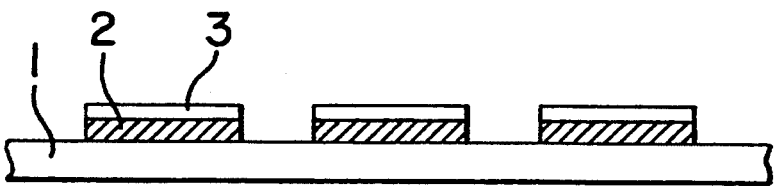
Figure 1D:
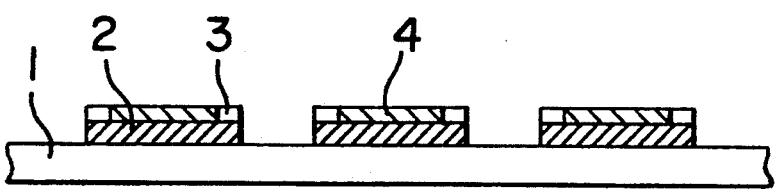
Figure 1E:
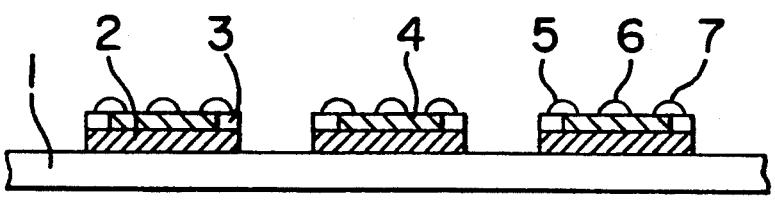

Referring to FIG. 1, a process for producing transistors on a high-molecular plastic film is shown. The process is developed in turn from step A to step E. At first, a plastic film 1 is prepared as starting material in step A. The plastic film 1 is made of polyimide plastic having high-thermal resistance. A $SiO_2$ layer is provided or stacked on the plastic film 1 by low-temperature process. In step B, the $SiO_2$ layer is partitioned into a matrix of substrate 2 by using resist coating, masking and photoetching technique to provide transistor substrate having size units required to drive LC pixels and disposed or arrayed with predetermined pitch along X and Y directions.

In step C, semiconductor or a-silicon layers 3 are deposited on the substrate 2 by using masking technique as well as low-temperature plasma CVD less than 400° C. In step D, a dopant such as P or S is also doped on the semiconductor layers 3 to provide active or switching cells 4 such as bipolar or field-effect transistors and diodes by using photo-lithography and thin-film providing technique.

In step E, bonding pads 5, 6 and 7 are provided or stacked on emitter, base and collector portions of the bipolar transistor per cell 4. Alternatively, bonding pads 5, 6 and 7 may be provided or stacked on drain, gate and source portions of the field-effect transistor per cell 4. Upon using diodes as the switching cell 4, bonding pads 5 and 6 are provided or stacked on anode and cathode portions of the diode. The bonding pads are made by stacking aluminum and gold layers or like on the semiconductor portion corresponding to electrodes thereof to buffer thermal expansion difference between the pad and semiconductor layer.

Figure 2:
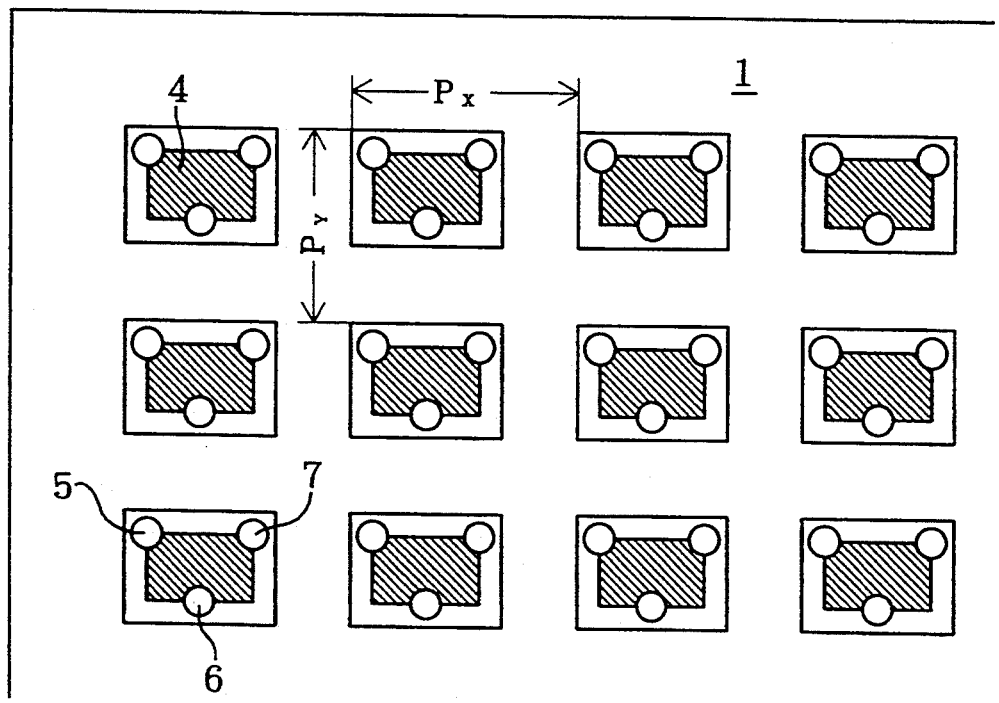
FIG. 2 shows a partial plan view of the transistors provided on a high-molecular plastic film.

FIG. 2 shows a partial plan view of the transistors 4 provided on the high-molecular polyimide film 1. The transistors 4 are arranged or aligned along X and Y directions with predetermined pitches or distances $P_x$ and $P_y$, respectively.

Figure 3:
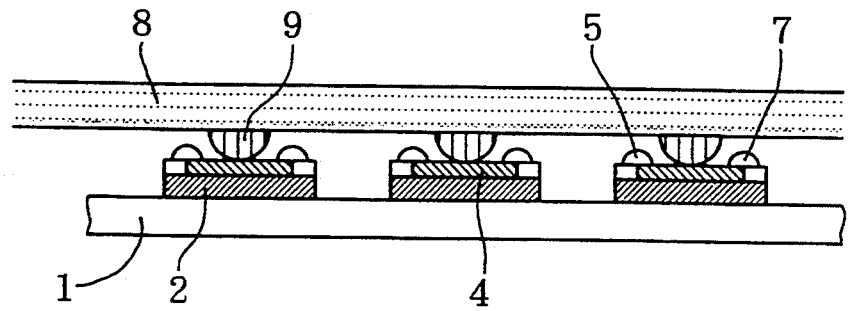
FIG. 3 shows a partial sectional view of the transistors on the plastic film and glued temporary on a transfer plate.

In FIG. 3, a transfer plate 8 having glue or adhesive agents 9 is applied or contacted to transistors 4 on the polyimide film 1 to adhere the transistors 4 individually to the transfer plate 8 and then hold the transistors 4 after removing the polyimide film 1. The transfer plate 8 adhered to the transistors 4 and the polyimide film 1 is dipped in a solvent to dissolve or remove the polyimide film. Therefore, the transfer plate 8 and adhesive agents 9 are made from solvent-resistive materials.

After performing above process or etching the polyimide film, the switching cells or transistors 4 are arranged with predetermined pitches along X and Y directions.

Figure 4:
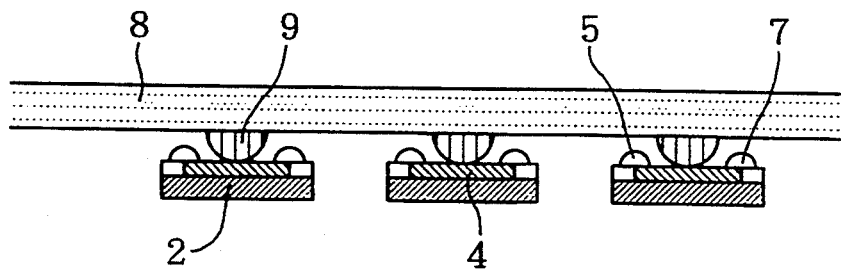
FIG. 4 shows a partial sectional view of the transistors separated from the plastic film and glued temporary on the transfer plate.

FIG. 4 shows the switching cells or transistors 4 each temporal adhered to the transfer plate 8 through the adhesive agent 9, and each having bending pads 5 to 7 closer to the substrate 8.

In order to bend the transistor 4 to the corresponding portion of a lower glass substrate through the bending pads, it must be transferred to another transfer plate 10 to reveal the bonding pads. Then, another transfer plate 10 having glue or adhesive agents 11 is applied or contacted to the transistors 4 to adhere the transistors 4 individually to the another transfer plate 10. The transfer plate 8 is then striped or peeled from another transfer plate 10 adhered to transistors 4. Therefore, the adhesive force of the adhesive agents 11 is set to be stronger than that of the adhesive agents 9.

Figure 5:
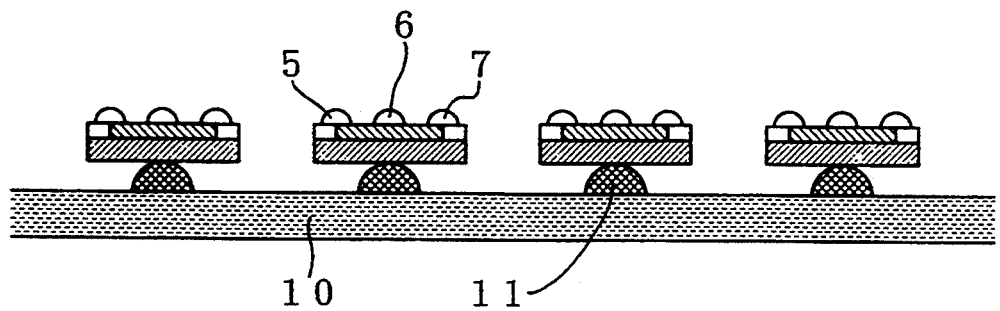
FIG. 5 shows a partial sectional view of the transistors separated from the transfer plate and glued temporary on another transfer plate.

FIG. 5 shows the transistors 4 adhered on the another transfer plate 10 through adhesive agents 11 and each having bonding pads remote from the transfer plate 10.

Figure 6:
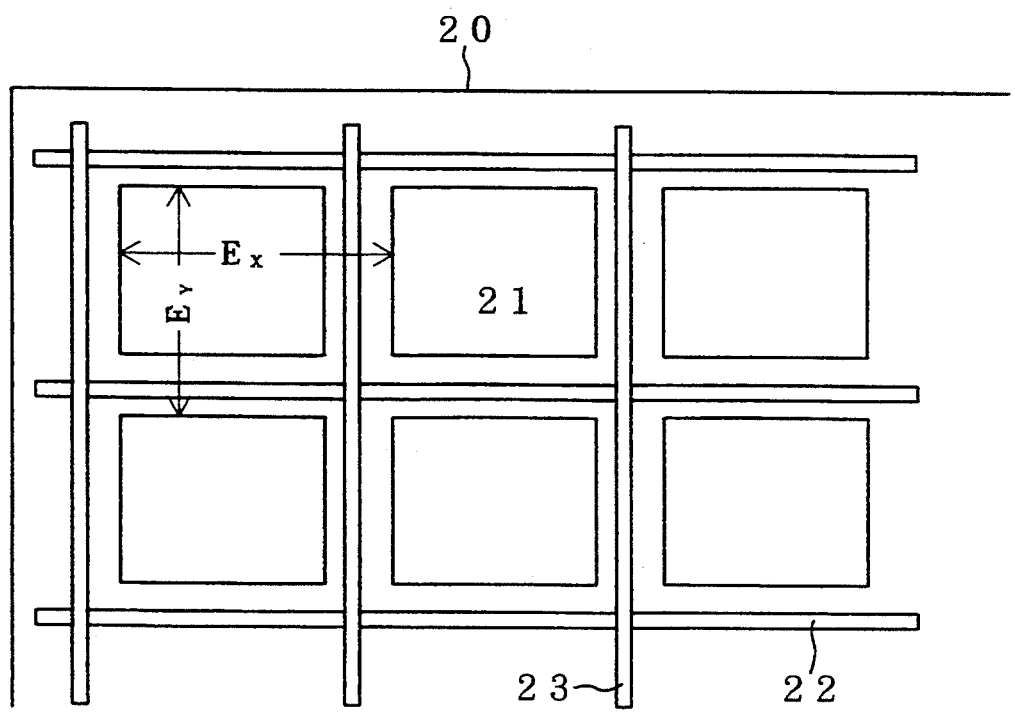
FIG. 6 shows a partial plan view of a matrix of transparent electrodes, column metal lines and row metal lines each provided or applied on a glass substrate, and each having bonding pads connected to the transistors in a matrix fashion according to the present invention.

FIG. 6 shows a partial plan view of the lower glass substrate 20. Transparent electrodes 21 are provided on the lower glass substrate 20 along X and Y directions. The transparent electrode 20 serves as a lower electrode of a Liquid Crystal pixel. Row or scan metal lines 22 is provided or embedded on the substrate 20 along X or row direction. Column or signal metal lines 23 are also provided or embedded on the substrate 20 along Y or column direction.

The distance $E_x$ between the transparent electrodes 21 along X direction is set to be a multiple of the distance or pitch $P_x$ between transistors 4 along X direction. The distance $E_y$ between the transparent electrodes 21 along Y direction is also set to be another multiple of the distance or pitch $P_y$ between transistors 4 along Y direction. Therefore, when one of transistors 4 is aligned to one pixel of the lower glass substrate 20, every other transistor 4 are also aligned to the corresponding pixels. Therefore, among transistors 4 temporal hold on the another transfer plate 10, transistors 4 each having an emitter bonding pad aligned to the scan line 22; a base bonding pad aligned to the signal line 23; and a collector bonding pad aligned to a peripheral portion of the lower electrode 21 are transferred to the glass substrate 20.

Figure 7:
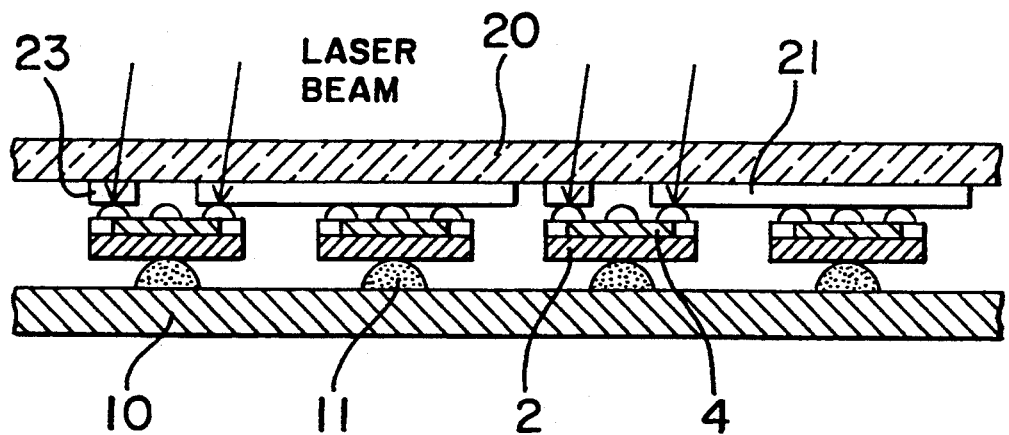
FIG. 7 shows a partial sectional view of the transistors on the another transfer plate to be bond to a glass substrate by laser beam.

Referring now to FIG. 7, in every other transistor 4, the emitter bonding pads are soldered or connected to the scan line 22 by a laser beam. The base bonding pads are also soldered or connected to the signal line 23 by another laser beam. The collector bonding pads are further soldered or connected to a peripheral portion of the lower electrode 21 by a laser beam.

The transistors 4 secured or connected to the glass substrate 20 are removed from the another transfer plate 10 by applying local heat at glue portions thereof.

After that, the another transfer plate 20 is moved or incremented repeatedly along X or Y direction relative to glass substrate to align the remaining transistors to the corresponding pixels of the glass substrate 20.

Embodiments

FIG. 1 is a process explanation showing steps for providing a basic substrate according to the invention.

A plurality of rectangular base or $SiO_2$ layers each having a thickness of 3,000 angstrom, a side of 50 $\mu m$ and a pitch of 70 $\mu m$ are provided on a polyimide film 1 by photo-lithography. In this case, the $SiO_2$ layer is stacked directly on the film 1. Further, a coating layer may be provided between the $SiO_2$ layer and film 1 to enhance the adhesion therebetween.

Semiconductor materials provided on the base layer 2 are not only an a-silicon but also poly-silicon as well as other compound semiconductor materials unless they are grow under low-temperature process because of a polyimide substrate. A dopant such as P and S or like is doped or diffused on the semiconductor layers 3 to provide active cells 4 such as bipolar or field-effect transistors and diodes.

Bonding pads 5, 6 and 7 made of gold and aluminum layers are provided or stacked on the transistor 4 to connect the transistor to the signal and scan lines and the pixel electrode. The transistors 4 to be provided are separated and independent finally each other.

To pick up the transistors 4 from the high-molecular polyimide film 1, the film is dipped into an etching solution such as an etching agent for a polyimide plastic. The separated transistors to be picked up must be transferred to a lower glass substrate 20 to provide a display 30.

Therefore, the transistors to be formed individually on the film 1 are transferred to a transfer plate made of glass, metal or plastic material having a hole for use in holding or storing. Etching-resistive adhesive agents each melt off under predetermined temperature are spotted on the transfer plate at points in alignment with the transistors to adhere them to the transfer plate.

After that, the polyimide film is removed from the transistors by the etching solution thereof to remain them onto the first transfer plate.

The transistors adhered on the first plate as shown in FIG. 1 are retransferred to another transfer plate to face a plane including bonding pads 5 to 7 as shown in FIG. 5 to a lower glass substrate of the display.

If a mounting pitch of the transistors to the lower glass substrate 20 is 140 $\mu m$, four time retransfer procedures are performed with a relative movement or offset of 70 $\mu m$ between the another transfer and the lower glass substrate. Therefore, if the mounting pitch is n times to that of the transistors, $n^2$ retransfer procedures are performed with a unit pitch therebetween where n is a positive integer more than two.

In this case, a matrix of transparent or ITO pixel electrodes 21, scan lines 22 and signal lines 23 are pre-provided on the lower glass substrate 20.

Figure 9:
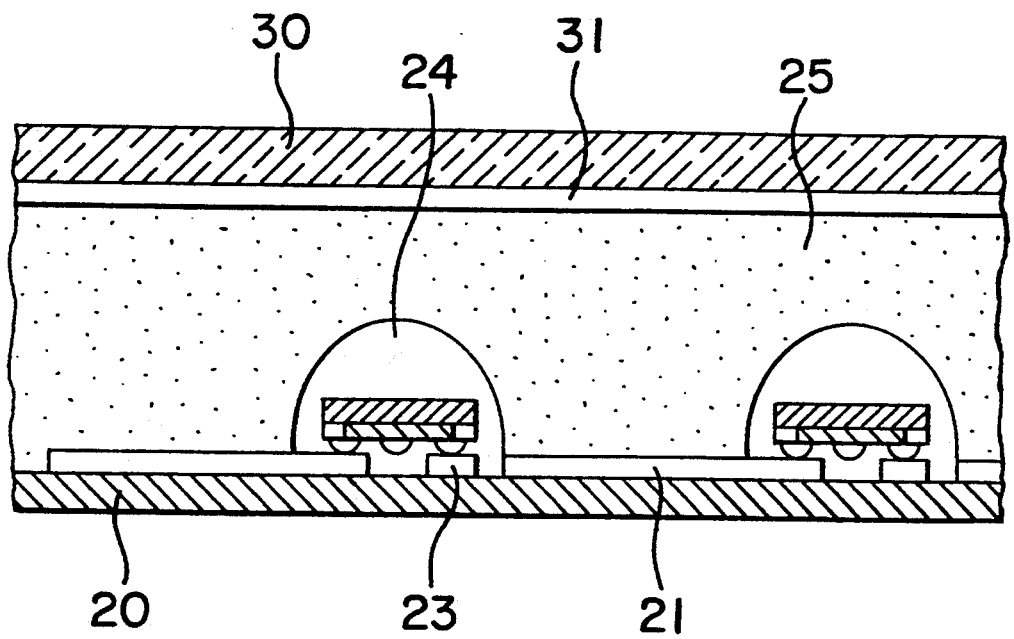
FIG. 9 shows a partial sectional view of a display in which Liquid Crystal material is filled between the lower and upper glass substrates.

FIG. 6 shows a partial plan view of a lower glass substrate 20. Connections of the transistors 4 to the transparent electrodes 21, scan lines 22 and signal lines 23 are performed by heat by YAG (Yttrium Arsenic Garnet) Laser device. The transistors 4 connected and fixed to the lower glass substrate 20 are covered with thermoplastic resin or gel 24 as shown in FIG. 9.

Figure 8:
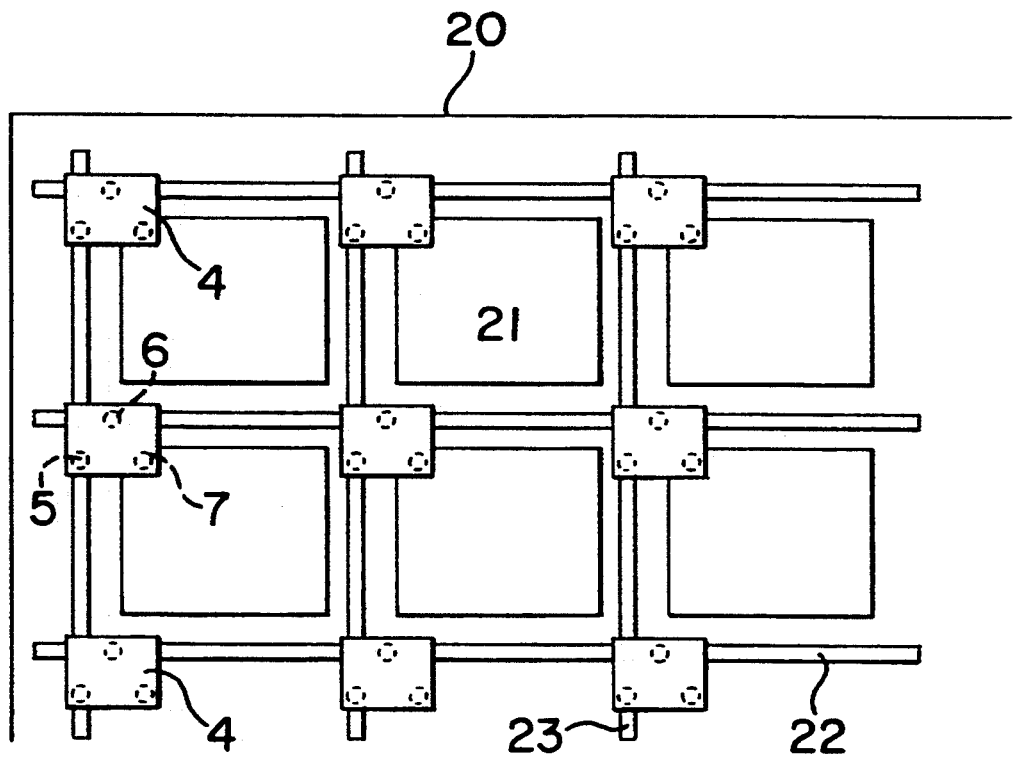
FIG. 8 is a partial plan view of the glass substrate showing the transistors each connected to the corresponding lower electrode, column and row line in up side down fashion.

FIG. 8 shows a plurality of transistors 4 each disposed inversely on the corresponding pixel or lower electrode 21 and connected to the corresponding pixel electrode, and row and column metal lines through the bonding pads. Referring to FIG. 9, a liquid crystal material 25 is filled between the lower glass substrate 20 and an upper glass substrate 30 having a common electrode 31 to provide a flat display. FIG. 9 shows a partial sectional view of the flat display.

In this process, two transfer procedures are necessitated in performing the flat display. However, it is possible to produce a flat display by one transfer procedure effectively upon performing transistors each having up side down bonding pads.

Figure 10:
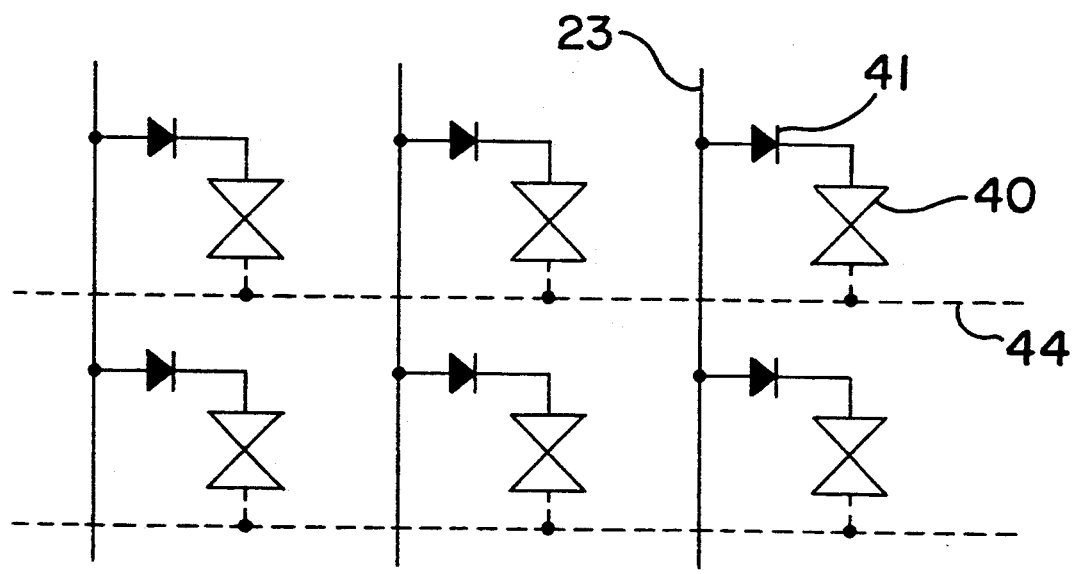
FIG. 10 shows a schematic circuit diagram having a diodes' matrix and liquid crystal pixels.
Figure 11:
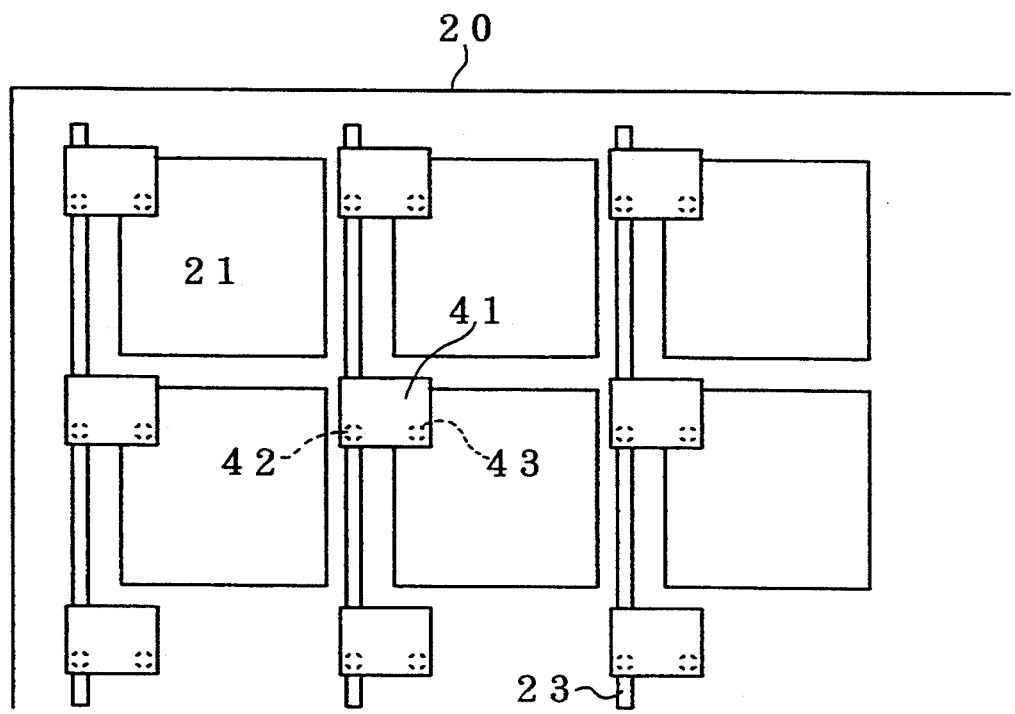
FIG. 11 is a partial plan view of a lower glass substrate showing diodes each connected to the corresponding lower electrode and column metallic line in up side down fashion.

FIG. 10 shows a schematic circuit diagram having a diodes' matrix and liquid crystal pixels 40. The pixel 40 has a lower pixel electrode 21 provided on the lower glass substrate 20 as shown in FIG. 11. A plurality of column lines 23 each extending along column direction are also disposed on the lower substrate 20 between the pixel electrodes. A pin diode 41 manufactured by similar method described above is disposed or aligned on the corresponding pixel electrode and column line in up side down fashion to connect its anode and cathode bonding pads 42 and 43 to the lower pixel electrode and column line, respectively.

Figure 12:
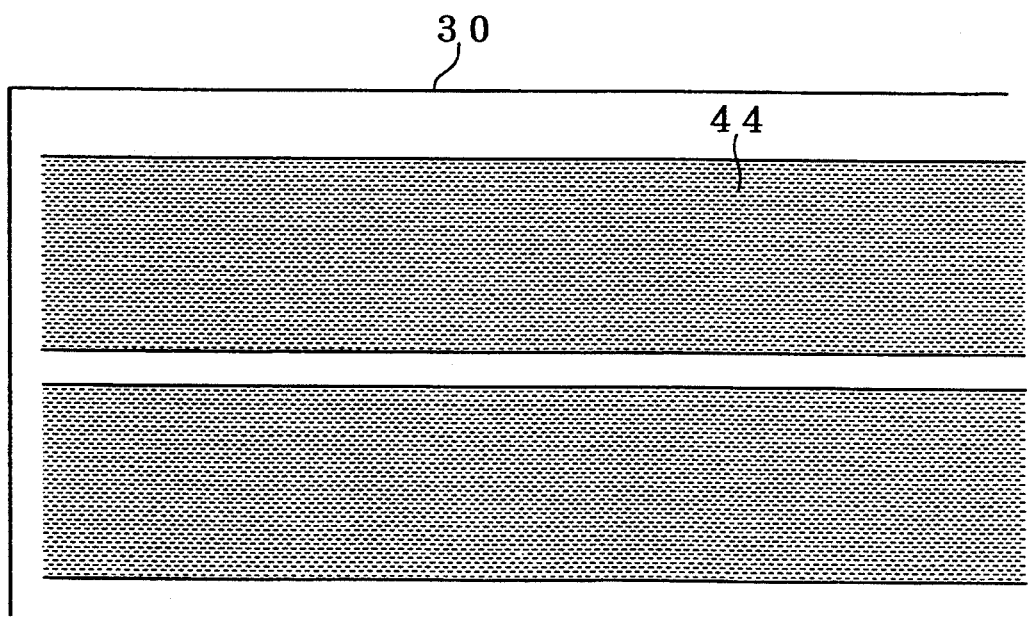
FIG. 12 is a partial plan view of an upper glass substrate having row electrodes.

Alternatively, a MIM (Metal Insulator Metal) diode may be used. The liquid crystal pixels 40 in alignment with one row direction has a common upper electrode 44 provided on the upper glass substrate 30 as shown in FIG. 12. Each upper electrode 44 has a wide substantial equal to that of the pixels 40. Therefore, transparent stripes of the upper common electrodes are arranged on the upper glass plate 30.

As described above, a large-scale flat display having twenty inches in diagonal can be fabricated easily and in cheap cost according to the invention.

What is claimed is:
1. A flat display comprises:
   a lower substrate including a matrix of pixel electrodes, column lines each extending along column direction and row lines each extending along row direction;
   an upper substrate having a common electrode;
   an electrically responsible material filled between said lower and upper substrates, and for changing its characteristic of light by applying electric energy;

a plurality of active elements provided on another substrate and each having three bonding pads connected to said pixel electrode, column and row lines, respectively, after each of said active elements is aligned with the corresponding position of said lower substrate in up side down fashion to transfer said active elements to said lower substrate through a transfer plate.

2. A flat display according to claim 1, in which said electrically responsible material is Liquid Crystal material for changing its transmittance, refractive index, absorption coefficient or the like of light upon applying said electric energy.

3. A flat display according to claim 1, in which said electrically responsible material is EC material for changing its transmittance, refractive index, absorption coefficient or the like of light upon applying said electric energy.

4. A flat display according to claim 2, in which said active element on said another substrate is transferred to said transfer plate and then retransferred to another transfer plate to align it with the corresponding position of said lower glass substrate.

5. A flat display according to claim 4, in which said another substrate is a high-molecular film.

6. A flat display according to claim 4, in which said another substrate is a polyimide film.

7. A flat display according to claim 6, in which the pitch of said pixel electrodes on said lower glass substrate is a multiple of that of said active elements on said another substrate.

8. A flat display according to claim 7, in which said active element is a bipolar transistor having emitter, base and collector bonding pads connected to said pixel electrode, column and row lines, respectively.

9. A flat display according to claim 7, in which said active element is a field effect transistor having drain, gate and source bonding pads connected to said pixel electrode, column and row lines, respectively.

* * * * *